United States Patent [19]

Midorikawa

[11] Patent Number: 4,751,584
[45] Date of Patent: Jun. 14, 1988

[54] DISPLAY-REPRODUCING APPARATUS

[75] Inventor: Yoshio Midorikawa, Tokyo, Japan

[73] Assignee: Tokyo Polymer Co., Ltd., Tokyo, Japan

[21] Appl. No.: 908,790

[22] Filed: Sep. 18, 1986

[30] Foreign Application Priority Data

Sep. 21, 1985 [JP] Japan ................... 60-209586
Oct. 12, 1985 [JP] Japan ................... 60-227451

[51] Int. Cl.⁴ ............................................. H04N 1/04
[52] U.S. Cl. ..................................... 358/285; 358/293; 358/294
[58] Field of Search ............... 358/102, 293, 285, 294; 250/578

[56] References Cited

U.S. PATENT DOCUMENTS 4,503,468 3/1985 Serinken ..................... 358/102
4,587,568 5/1986 Takayama .................. 358/293

Primary Examiner—Edward L. Coles, Sr.
Attorney, Agent, or Firm—Oblon, Fisher, Spivak, McClelland & Maier

[57] ABSTRACT

A display-reproducing apparatus comprises a display board, a reading means for reading information displayed on the board and a reproducing device for reproducing the information read by the reading means, wherein the board is so formed that written information by a writing means and a projected image can be displayed on the surface, and the written information is erasable, and the reading means is capable of reading both the written information and the projected image by scanning a surface of the board.

17 Claims, 7 Drawing Sheets

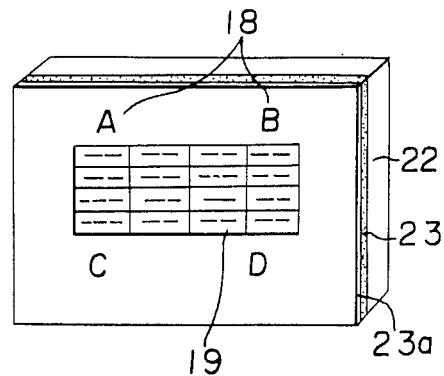
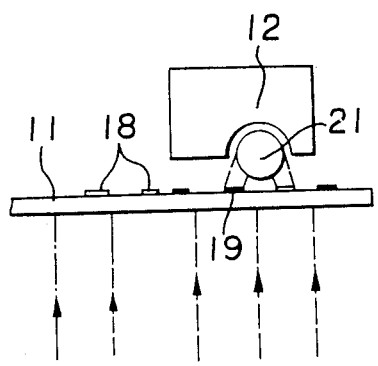
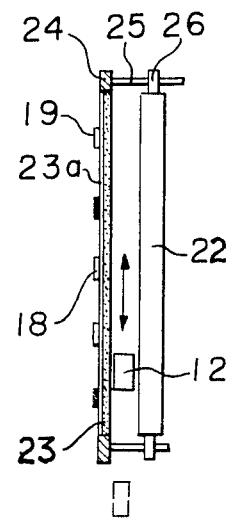

(a)

(b)

DISPLAY-REPRODUCING APPARATUS

The present invention relates to a display-reproducing apparatus.

There have been known display-reproducing apparatuses constructed in such a manner that information written on a board by a pen is read by a reading means, and the information read is reproduced by a reproducing device, as disclosed in Japanese Unexamined Patent Publication Nos. 171695/1984 and 212076/1984.

The conventional display-reproducing apparatuses are clasified into two types: an apparatus of such a type that a reading means scans a surface of the board to read the information written on the board surface, and an apparatus of such a type that the reading means is fixed at an end of a surface of the board and a film constituting the board surface is passed in the reading means so that the information written on the film is read. The later type of the apparatus can be provided with a plurality of surfaces on which the information is to be written. The display-reproducing apparatuses having the construction as above-mentioned are widely used in conferences or meetings since the information written on the board surface can be reproduced for distribution.

In the conventional display-reproducing apparatus, however, there have been problems as follows.

It is necessary to write data to be frequently used (such as the lines of a table) on the board each time it is used. The work for writing the data is troublesome and time consuming. For this, there is known a display-reproducing apparatus having a board surface in which the data to be frequently used, such as the lines of the table are previously provided in a manner as unerasable. However, such board surface has the drawback that it is applicable only to use the data. Even though the display-reproducing apparatus is provided with a plurality of board surfaces, its usage for the unerasably written data is limited, and therefore can not be widely used.

In the conventional display-reproducing apparatus, to write on the board surface a complicated drawings and a large quantity of information disadvantageously requires much time and work. Especially, it is very difficult to quickly write the content of a manuscript previously prepared on the board surface.

It has been known to display the content of the manuscript previously prepared on the board surface by use of a projecting apparatus such as an overhead projector. However, it has been impossible to read an image projected on the board surface by the reading device so that the projected image is reproduced on a paper. Namely, in such type of display-reproducing apparatus that the reading means is moved for scanning, the shade of the reading means overlaps the projected image, and in such type of the apparatus that the reading means is fixed, the projected image on the film surface can not be moved along with the film when the film is moved on the board.

It is an object of the present invention is to eliminate the disadvantages of the conventional display-reproducing apparatus and to provide a display-reproducing apparatus which comprises a display board, a reading means for reading information displayed on the board, and a reproducing device for reproducing the information read by the reading means, wherein the board is so formed that written information by a writing means and a projected image can be displayed on the board, and the written information is erasable, and the reading means is capable of reading both the written information and the projected image by scanning a surface of the board.

The display-reproducing apparatus according to the present invention is divided into two types depending on the way of focusing a projected image on the board surface.

A first type of the apparatus has a construction that projection of light is given on the same side of the board surface on which information is written by the writing means (hereinbelow, it is referred to as the apparatus 1.). A second type of apparatus has a construction that projection of light is given from the opposite side of the board surfaces on which the information is written (hereinbelow, it is referred to as the apparatus 2.).

The apparatus 1 is further clasified into two depending on the position of the reading means. Namely, there are provided an apparatus having the reading means placed at the same side as the surface to be written (hereinbelow, it is referred to as the apparatus 1-1.), and the apparatus having the reading means at the opposite side to the surface to be written (hereinbelow, it is referred to as the apparatus 1-2.).

Similarly, there are provided the apparatus having the reading means placed at the same side as the board surface to be written in which projection is carried out from the opposite side to the board surface to be written (hereinbelow, it is referred to as the apparatus 2-1), and the apparatus having the reading means placed at the opposite side to the surface to be written in which the projection is carried out from the opposite side to the surface to be written (hereinbelow, it is referred to as the apparatus 2-2.).

In any type of the apparatuses 1-1, 1-2, 2-1, 2-2 of the present invention, it is important that both the written information and the projected image on the surface or the surfaces are read by a single reading means, and the read information is reproduced by the reproducing device.

In such type of the apparatus that a projector is placed at the opposite side to the board surface to be written, it is necessary that the projected image is visible from the side of the surface to be written. Accordingly, an opaque board is not usable. On the other hand, a completely transparent board does not form the projected image. Accordingly, when the transparent board is used, the board has to be provided with a layer which allows a part of incident light to pass through and causes irregular reflection to the other part of the light. The layer may be present at either side of the front or rear surface of the board, or may be present inside the board.

In the apparatus in which the reading means is placed at the opposite side to the surface to be written, the reproducing of the information has to be carried out by reversing the written information, which may be carried out by use of a mirror or an electronic circuit.

The board surface may not be fixed but may be constructed by use of a plurality of movable films to provide a plurality of display surfaces on which the information is written by the writing means (in this case, the surfaces can not be moved with the projected image.).

Each of the four types of the display-reproducing apparatuses according to the present invention is further discussed.

In the apparatus 1-1, the board is provided with a surface on which the information is written by the writing means and the written information can be erased.

Further, the board has transparency such that the information written by the writing means and the projected image are visible, or in the case that the projected image is focused on the reverse surface of the board, the projected image is visible from the front surface on which the information is written. In the apparatus 1-1, measures are made so as not to be affected by the shade of the reading means itself when it scans on the board surface to read the written information and the projected image. One example of the measures is that a sensor is provided at each side surface of the reading means so that the first sensor reads the written information on one of the surfaces of the board and the second sensor reads the projected image on the other side of the surfaces. The second example is that a gap is provided between the reading means and the board surface so as to allow entrance of light, whereby the reading means reads the projected image focused on the board surface by having the light of projection pass in the gap and the information written in the same place where the projected image is displayed. Another example is that one or more mirrors are provided for the reading means so that the projected image is focused on the board surface where the shade of the reading means falls by utilizing reflection of light by the mirrors, whereby the reading means simultaneously reads the written information and the projected image.

In the apparatus 1-2, the board is provided with a surface which can be written by the writing means, the written information being erasable. Further, the board is capable of displaying the information written by the writing means and the projected image from the projector. The board is adapted to transmit light to such extent that the light from the projector is sensed by the reading means. Various measures can be considered to transmit the light in the board. For example, the board is formed by overlaying a transparent material and an opaque material so that they are mutually movable. In the apparatus of this type, the information is written on the transparent part. When the written information and the projected image are read by the reading means, the opaque part is moved so that light for projection from the projector reaches the reading means.

As another type of the apparatus, there is one having the board which is provided with a layer adapted to transmit the light and to cause irregular reflection of the light to such extent that the projected image is focused on the board. As the board having the function as above-mentioned, there are first one formed by laminating a material for causing appropriate irregular reflection of light (such as paper, cloth and so on) and a transparent material, second one of a transparent material in which minute projections and recesses are formed in its surface, and third one of a transparent material one surface of which is applied with printing and coating so as to transmit a certain amount of light. The apparatus 1-2 has an advantage in addition to those mentioned foregoing that the construction of the reading means or the board can be simple.

In the apparatuses 2-1, 2-2, the board has a surface on which the information is written by the writing means and the written information can be erased. In the first apparatus 2-1, the reading means is placed at the side of the surface on which the information is written. In the second apparatus 2-2, the reading means is placed at the opposite side to the surface on which the information is written.

The first apparatus 2-1 is described in more detail. The board is adapted to transmit light so as to allow a man being present in front of the board to read the projected image projected from the rear side of the board and the information written on the board surface, by providing the layer which transmits a part of the incident light and causes irregular reflection of the other part of the light.

In the apparatuses 2-1, 2-2 of the present invention, much space is required at the rear side of the apparatus (the side where the projector is placed) in comparison with the apparatuses 1-1, 1-2. The space can, however, be reduced by use of a reflector which reduces the distance between the projector and the board or by improving the projector.

Particularly, the display-reproducing apparatus 2-1 of the present invention has an advantage that the projected image can be partly hidden on the board, in addition to the advantages as described before. The way hiding is to apply the writing means having the same color as the board (such as a white marker) to coat the portion of the board to be hidden, whereby the hidden part of the projected image is not reproduced when the image is read by the reading means and reproduced by the reproducing device. Namely, when modification of the projected image is made on the board, the hidden part is not produced. Further, when modification is made by the writing means with respect to the hidden part, only the modification made by the writing means is reproduced. Thus, the projected image can be easily modified on the board and reproduced on a paper without necessity of modification of the manuscript inserted in the projector.

The display-reproducing apparatus 2-1 eliminates such disadvantage that the projected image on the board is erased by the shade of a hand of a corrector when the projected image is to be corrected in the case that light of the projection is given from the same side of the surface to be written. Namely, the light for projection is given from the opposite side to the surface on which the information is written, whereby the shade of the corrector's hand does not affect the projected image. Accordingly, the modification of the projected image can be easily carried out in view of the portion to be corrected of the projected image.

In the display-reproducing apparatus of the present invention, the reading means is constructed in such a manner that a reflecting mirror is provided at the side of the reading means so that the light emitted from the projector and passing through the board shines the part of the projected image to be corrected. Thus, the problem that the part to be hidden of the image is reproduced in the case that application of the marker to the projected image is incomplete can be eliminated.

The display-reproducing apparatus of the present invention is so constructed that the reading means scans on the board surface to read the projected image and the written information.

Further, as an expedient for providing easy observation of the written information and the projected image, the board is shaped in a curved form so that the written information and the projected image can be observed from the lateral side. With this configuration of the board, unclearness of the projected image at the peripheral portion of the board, which may be caused by a kind of projector used, can be eliminated. As another expedient for easy observation, a flat lens or a light diffusing layer having minute projections and recesses may be provided at either surface of the board.

The display-reproducing apparatus of the present invention may be provided with a light quantity adjusting means for adjusting the intensity of light emitted from the projector in accordance with scanning of the reading means, whereby unevenness of thick and thin in a reproduced product can be eliminated, such being caused by unevenness in brightness of the projected image on the board (the peripheral portion of the board is dark) depending on the projector used.

The reading means used in the present invention is adapted to optically read the projected image and the written information to convert them into electric signals. Accordingly, it is not always necessary to use an additional light source because a sufficient amount of light is obtainable when the projector is used. However, when no projector is used or the quantity of light from the projector is small, it is difficult to read the written information on the board. In this case, the additional light source (hereinbelow, it is referred to as an auxiliary light source) may be attached to the reading means. The auxiliary light source is operated only when the quantity of light from the projector is insufficient or no projector is used.

Various other objects, features and attendant advantages of the present invention will be more fully appreciated as the same becomes better understood from the following detailed description when considered in connection with the accompanying drawings wherein:

FIG. 12 is a diagram showing the function of the apparatus of the present invention;

FIG. 13 is a perspective view of the board used for embodiments in which the projector is placed at the same side of the board surface on which the information is written;

FIG. 14 is a plane view of the embodiment shown in FIG. 13 performing scanning operation;

In the following several preferred embodiments of the display-reproducing apparatus according to the present invention will be described with reference to the drawings.

Figure 1:
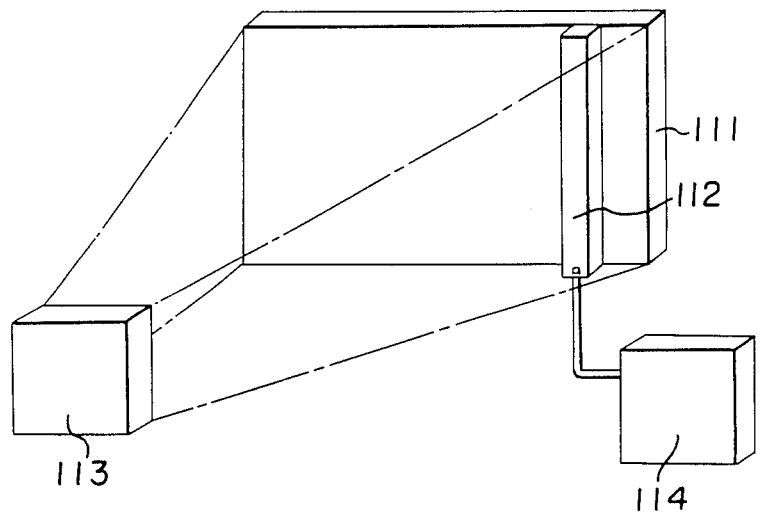
FIG. 1 is a diagram showing an embodiment of the display-reproducing apparatus 1-1 of the present invention.
Figure 2:
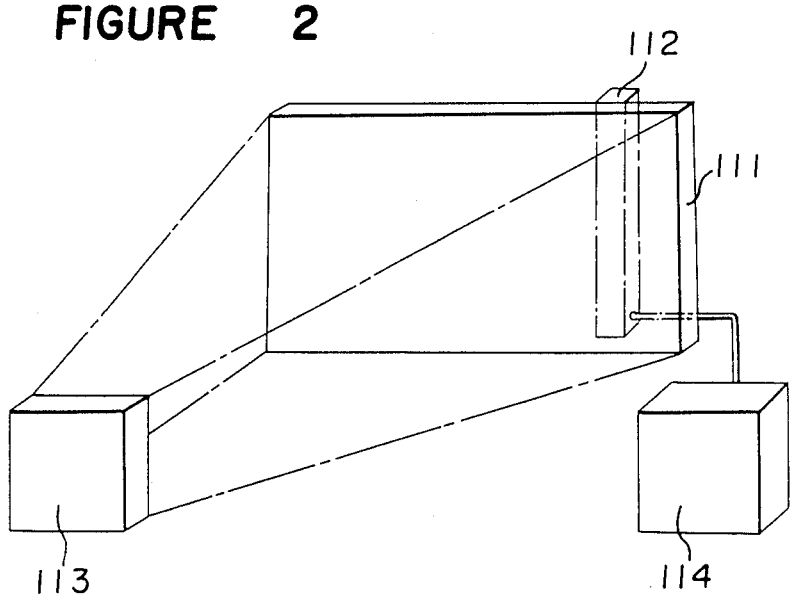
FIG. 2 is a diagram showing another embodiment of the apparatus 1-2 according to the present invention.
Figure 3:
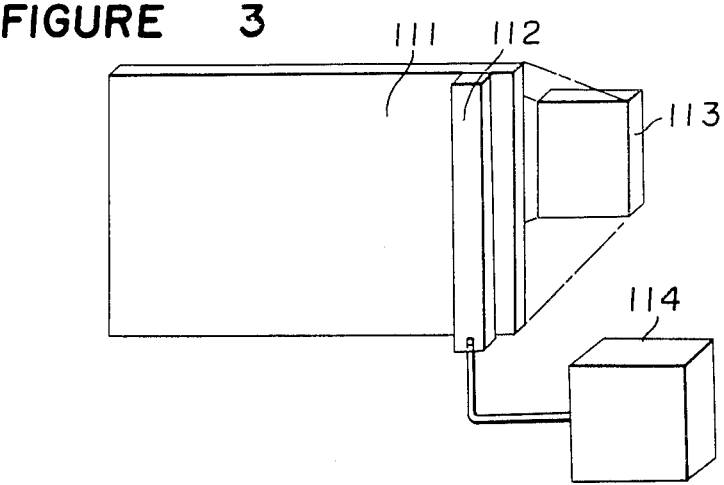
FIG. 3 is a diagram showing still another embodiment of the apparatus 2-1 according to the present invention.
Figure 4:
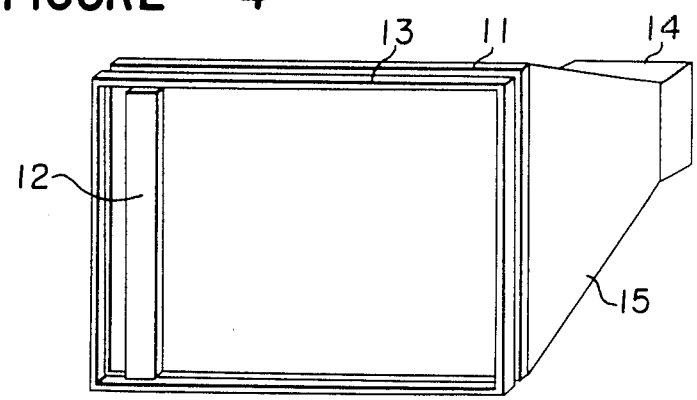
FIG. 4 is a perspective view of the embodiment shown in FIG. 1 in which a projector is provided at opposite side to the surface of the board on which information is written.
Figure 5:
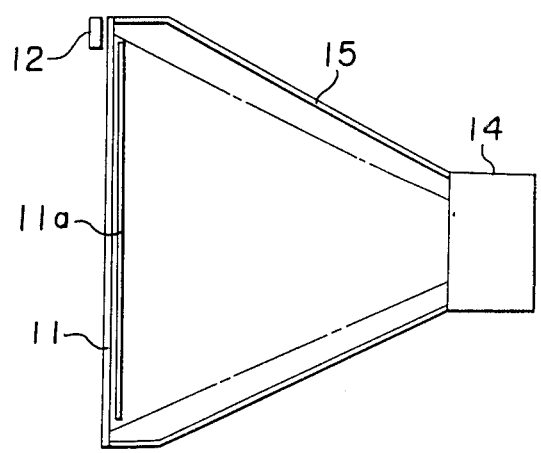
FIG. 5 is a vertically cross-sectional view of the embodiment shown in FIG. 1.

FIGS. 1, 2 and 3 respectively show the display-reproducing apparatus 1-1, 1-2 and 2-1 as described before. In FIGS. 1 to 3, a reference numeral 111 designates a display board (hereinbelow, referred to simply as a board), a numeral 112 designates a reading means, a numeral 113 designates a projector such as an overhead projector (hereinbelow, referred to simply as a projector), and a numeral 114 designates a reproducing device or a copying device. The board 111 is adapted to display information written by a writing means such as a marker, a pencil, a felt pen (hereinbelow, referred to simply as a marker) as well as a projected image given by the projector 113. The reading means 112 reads the written information and the projected image by scanning the board surface and forwards the written information as electric signals to the reproducing device 113. The reproducing device 113 receives the electric signals and reproduces the written information on a medium such as peper. Thus, the reproduction of the written information and the projected image on the board is obtainable.

FIGS. 4 to 7 show a first embodiment of the display-reproducing apparatus in which the projector is placed at the rear side of the surface on which the information is written.

In FIGS. 4 to 7, a reference numeral 11 designates the board which has a surface on which information can be written by a marker and the written information is erasable by cloth or a suitable erasing material. The board 11 is further provided with a layer for forming a projected image by irregular reflection of incident light on its surface to be written, its opposite surface or its inside layer. A numeral 12 designates the reading means which is placed at the front surface side of the board 11 to read the information written in the front surface. A numeral 13 designates a guide frame for guiding the reading means during scanning operation and a numeral 14 designates the projector. A numeral 15 designates a dark box for effecting projection of light. Dotted lines in FIG. 5 designate lines of projection.

The function of the first embodiment of the present invention will be described.

Figure 6:
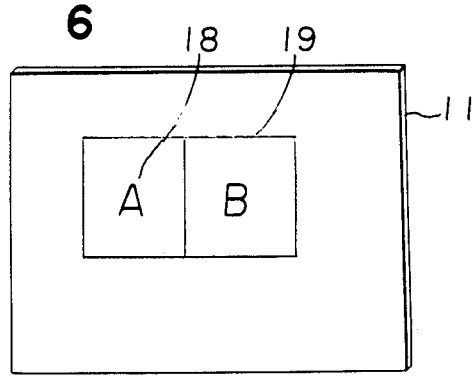
FIG. 6 is a front view of the board of the present invention.
Figure 7:
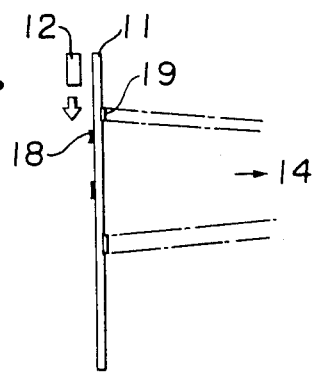
FIG. 7 is a diagram showing the function of the display-reproducing apparatus of the present invention.

A projected image 19 such as characters, diagrams and so on projected by the projector 14 is displayed on the rear surface of the board 11 as shown in FIGS. 6 and 7. The projected image 19 is visible from the front surface side. When information 18 is written on the front surface of the board 11 by use of the marker, the written information 18 is overlapped on the projected image 19 such as diagram, table and so on which is visible from the front surface side. Then, the reading means 12 is moved along the front surface of the board to scan the projected image 19 such as diagram, table and so on as well as the written information 18 so that they are reproduced by the reproducing device 114.

The projector 14 is contained in the dark box 15 to clearly display the projected image 19 on the board 11. In some case, reproduction of the projected image and written information are reproduced without using the projector to save power.

As clearly shown in FIG. 7, in the first embodiment, the projector 14 is positioned at the side of rear surface of the board which is opposite the surface on which the information is written by a marker.

Figure 8:
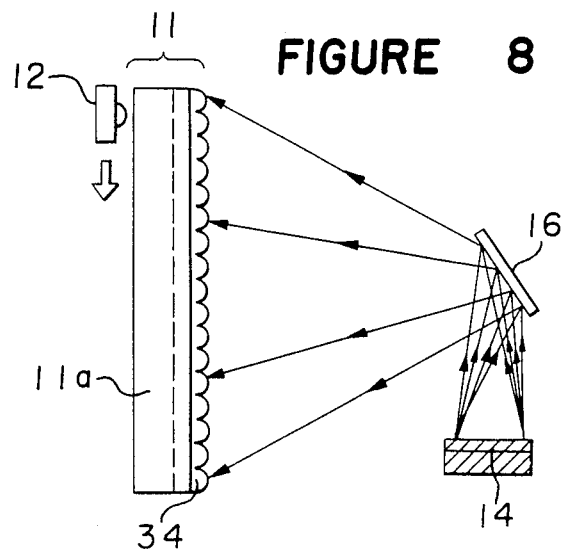
FIG. 8 is a plane view of the embodiment of the present invention shown in FIG. 2 in which the projector is provided at the opposite side of the surface on which the information is written.

FIG. 8 shows a second embodiment of the display-reproducing apparatus of the present invention in which the projector is placed at the opposite side to the surface to be written with respect to the board 11. In this embodiment, a reflecting plate 16 faces the board 11 inclining at an angle of about 45° with respect to the line intersecting the board at the right angle. Accordingly, the distance between the board 11 and the projector 14 can be reduced since light of projection goes to the reflecting plate in substantially parallel to the board 11 and the reflected light shines the board 11.

Figure 9:
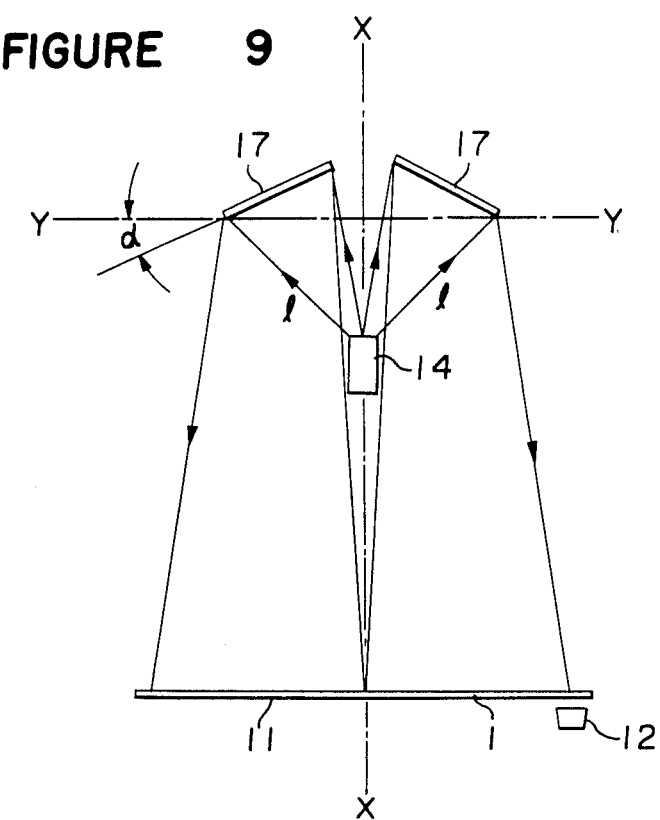
FIG. 9 is an illustrative view of the embodiment of the present invention shown in FIG. 3.

In the next place, a third embodiment of the present invention will be described with reference to FIG. 9.

The projector 14 is placed on the center line X—X of the board 11 so as to direct the light of projection in the opposite direction of the board 11. A pair of reflecting plates 17, 17 are symmetrically positioned with respect to the center line X—X with their outer edges inclined toward the board 11. Accordingly, light 1 projected from the projector 14 is reflected at the symmetrically positioned reflecting plates 17, 17. The light divided at the reflecting plates 17, 17 is focused on the board 11. An angle α formed by the parallel line Y—Y of the board 11 and either of the reflecting plates 17, 17 is so determined that when the light 1 is focused on the board 11 by the reflection on the reflecting plates 17, 17, the center of the projected image is coincident with the center line X—X of the board 11. By determining suitably the angle α, an image can be expressed on the board 11 without causing any distortion.

Figure 10:
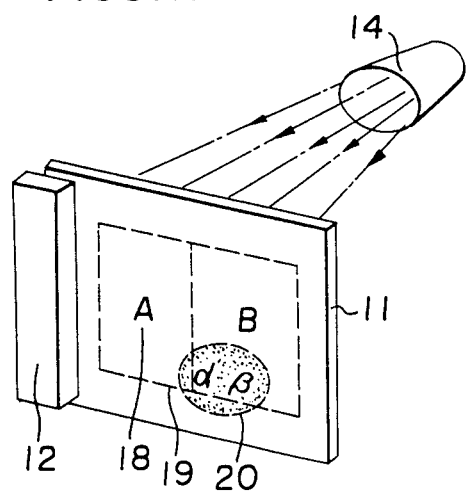
FIG. 10 is a perspective view for explaining modification of a projected image.
Figure 11:
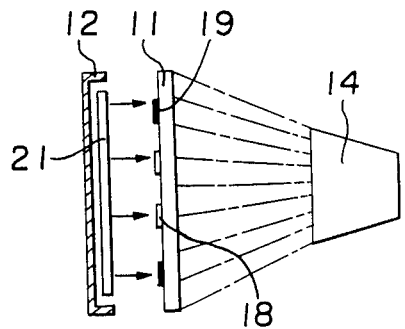
FIG. 11 is a diagram showing modification of the projected image.

FIGS. 10 to 12 show how the modification of the projected image is carried out in the case that the projector 14 is provided at the opposite side to the board surface on which the information is written.

In the Figures, the same reference numerals designate the same or corresponding parts. A reference numeral 20 designates a part of the projected image to be corrected, and a numeral 21 designates an auxiliary light source for correction which is attached to the reading means 12. The intensity of the light emitted from the auxiliary light source 21 is made equal to or smaller than the light from the projecter 14.

Figure 15:
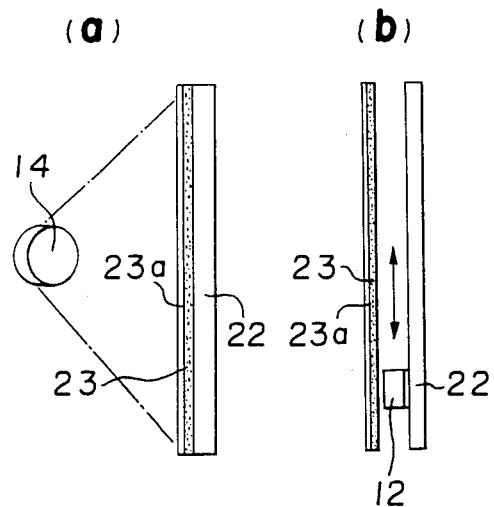
FIG. 15 is a diagram of the embodiment as shown in FIG. 13.

The part of the image to be corrected 18 is painted by a thick white marker. Then, the light from the auxiliary light source for correction is reflected at a layer given by the white marker when the reading means 12 scans the board surface, and the part of projected image painted by the white marker is not read by the reading means because the painted white layer has the same color as the white board. The information written by a black marker on the white layer is read by the scanning of the reading means. In this case, if the intensity of light of projection from the projector is too large, the light pass through the white layer so that the hidden part of the projected image is read. Accordingly, the intensity of the light from the projector has to be adjusted. FIGS. 13 to 15 show a separate embodiment of the display-reproducing apparatus in which the projector is provided at the same side of a board surface on which the information is written by the marker.

In FIGS. 13 to 15, a reference numeral 22 an opaque plate which may be a conventional board, a numeral 23 designates a transparent or semi-transparent film provided one surface of the opaque plate material 22. A transparent or semi-transparent fluorocarbon resin constitutes the surface layer 23a of the film 23, whereby the surface can be written by the marker and the light of projection passes through the surface layer. A numeral 24 designates a guide frame surrounding the outer edge of the film 23, guide rods 25 are projected from the guide frame 24. A numeral 26 designates a plurality of guiding projections projecting from the outer peripheral part of the opaque plate material 22.

The function of the embodiment shown in FIGS. 13 to 15 will be described.

Referring to FIG. 14, the information 18 is written on the surface of the film 23 by the marker, and then the projected image 19 such as characters, a diagram, a table and so on is displayed on the surface by the projector 14. When reproduction of the projected image together with the written information is required, the opaque plate material 22 is separated backward and the reading means 12 is moved along the opaque plate material 22 as a guiding member to scan the rear surface of the film 23.

The thin film 23 is closely contact with the opaque plate material 22 when the information is written and the light of projection is made. When the reproduction is required, the opaque plate material 22 is retracted along the guide rods 25 attached to the guide frame 24 which supports the film 23 to thereby form a space between the film 23 and the plate material 22 as shown in FIG. 15b. Then, the reading means 12 is put in the space thus produced and scans the rear surface of the film 23 while the opaque plate material 22 is used as the guiding member for the reading means. Thus, the guide frame 24, guide rods 25 and projections 26 assist to form the space between the thin film 23 and the plate material 22.

Figure 16:
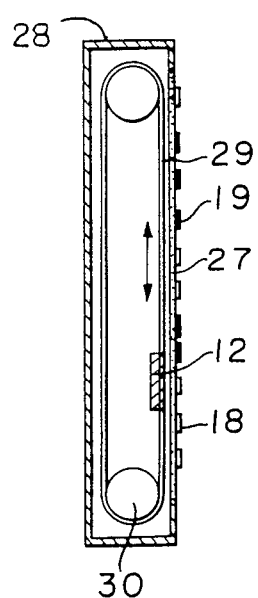
FIG. 16 is a cross-sectional view diagramatically illustrated of the embodiment in which the projector is placed at the same side of board surface on which the information is written.

FIG. 16 shows another embodiment of the display-reproducing apparatus according to the present invention.

In FIG. 16, a reference numeral 28 designates a frame member to stretch a film 27 and a numeral 29 designates an opaque sheet material which is vertically moved by means of guide rollers 30 and which supports the reading means 12. Accordingly, the reading means 12 attached to the opaque sheet material 29 scans the film 27 from its reverse side while the opaque sheet material 29 is vertically moved between the guide rollers 30, 30 in the frame 28.

Figure 17:
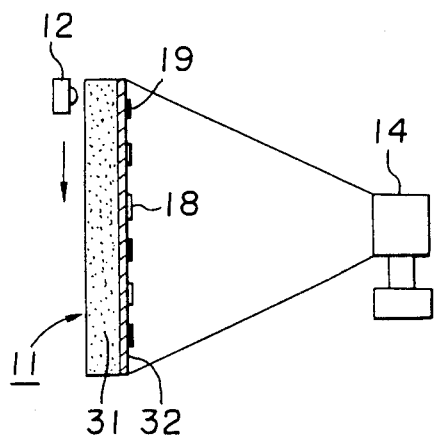
FIG. 17 is a diagram of the embodiment shown in FIG. 16.

FIG. 17 shows a separate embodiment of the display-reproducing apparatus according to the present invention. The board 11 comprises a nearly transparent reinforcing board 31 and a surface film 32 attached to one surface of the board 31, the film 32 being of a material for causing irregular reflection of light. The reading means 12 is placed at the opposite side of the film 32 with respect to the reinforcing board 31 to read the projected image 19 projected from the projector 14.

The surface film 32 is selected from such a material that it allows the light to pass through and the information can be written by the writing means such as a marker, the written information being erasable, and the film 32 may be of fluorocarbon resin. The reinforcing board 31 is used to give rigidity to the film 32, and is selected from a transparent or nearly transparent material so that the written information is readable by the reading means from the opposite side of the reinforcing board 31. Thus, the reading means 12 for scanning the rear surface of the board 11 can read the projected image given by the projector 14 as well as the information 18 written on the surface film 32 on the board 11 written by the marker so that the projected image and the written information 18 are reproduced.

In this embodiment that the projector is placed at the same side of board surface on which the information is written and the reading means scans the rear surface side of the board, an auxiliary light source may be provided at the same side of the board surface to be written, whereby the reading meand can scan the written information on the board surface by using the auxiliary light source when the projector 14 is not used. FIGS. 8 and 18 to 20 show preferred embodiments of the board surface to improve the difficulty that the light of projection from the projector is diffused at the peripheral part of the board which makes the projected image unclear, hence the reading means can not read the projected image. In the embodiments shown in FIGS. 8 and 18 to 20, a light diffusing layer such as layer of minute projections and recesses or a flat lens is provided on the surface opposite to the surface to which scanning by the reading means is carried out, whereby the picture image at the peripheral part of the board can be clearly displayed.

In the following, the embodiments shown in FIG. 8 and 18 to 20 will be described in more detail.

In the embodiment shown in FIG. 8, a layer 34 having many projections and recesses is provided at the outer surface side of the board 11. In any case, it is desirable that the layer causes irregular reflection of light while some part of light is transmitted so that the written image can be read from the rear side of the board 11.

With the structure as above-mentioned, the projected image displayed in the peripheral portion of the board can be certainly read by the reading means.

Figure 18:
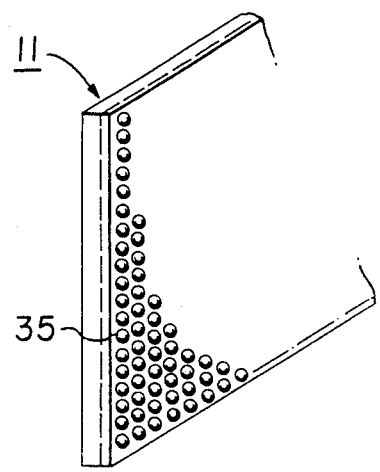
FIG. 18 is a perspective view partly broken of the embodiment in which a layer consisting of a number of spherical bodies is provided on the board.

FIG. 18 shows another embodiment of the board in which a layer 35 comprising a number of balls of transparent glass or plastics of a diameter ranging from 100 μm/500 μm is attached to the outer surface of the board 11, instead of the layer having minute projections and recesses 34 as shown in FIG. 8.

Figure 19:
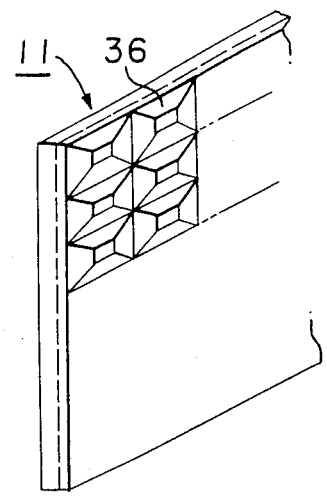
FIG. 19 is a perspective view partly omitted of the embodiment in which a number of trapezoidal projections are formed on the board.

FIG. 19 shows still another embodiment of the board in which a layer 36 having trapezoidal projections and recesses is attached to the outer surface of the board 11 instead of the layer 34 having minute projections and recesses as shown in FIG. 8.

Figure 20:
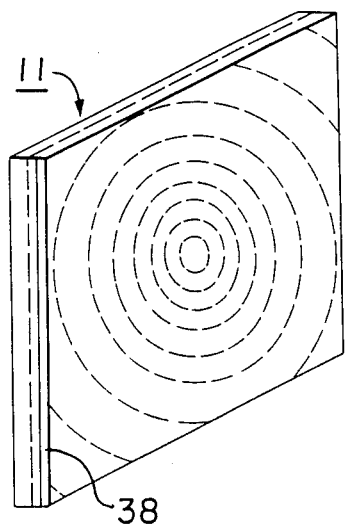
FIG. 20 is a perspective view of the embodiment in which a flat lens is attached to the board.

FIG. 20 is a separate embodiment of the board 11 in which a flat lens 38 is attached to the reinforcing board 33 instead of the layer 34 shown in FIG. 8.

By using various kinds of layers as above-mentioned, a clear projected image can be obtained even in the peripheral portion of the board.

Figure 21:
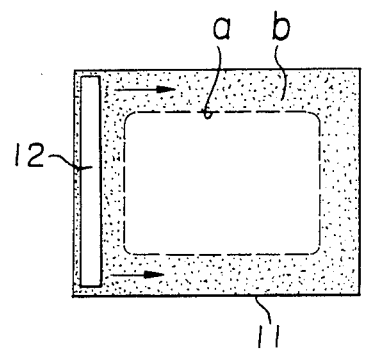
FIG. 21 is a diagram showing dark and bright portions on the board surface.

FIG. 21 shows another embodiment of the present invenion. This embodiment is to eliminate the disadvantage that when the projected image is displayed on the board 11, the peripheral portion b of the board is dark in comparison with its central portion whereby the reproduced product is unclear at its peripheral portion. Accordingly, in this embodiment, an expedient is made so as to increase the intensity of light from the projector when scanning of the reading means 12 is carried out for the peripheral portion.

I claim:

1. A display-reproducing apparatus comprising:
   a display board;
   a reading means for reading information displayed on the board; and
   a reproducing device for reproducing the information read by the reading means, wherein said board is formed such that both written information by a writing means and a projected image can be displayed simultaneously on the board with the written information being erasable, and said reading means is selectively capable of reading either the written information and the projected image or both by scanning a surface of the board.

2. The display-reproducing apparatus according to claim 1, wherein the reading means scans the surface of the board on which the information is to be written by the writing means and the projected image is given from the opposite side.

3. The display-reproducing apparatus according to claim 2, wherein the display board has a layer which allows a part of incident light to pass through and causes irregular reflection to the other part of the light.

4. The display-reproducing apparatus according to claim 3, wherein the display board is formed by laminating a transparent body and sheets of paper or cloth.

5. The display-reproducing apparatus according to claim 3, wherein the display board is a transparent body having a surface which is provided with minute projections and recesses.

6. The display-reproducing apparatus according to claim 3, wherein the display board is a transparent body having at least one surface to which a printing or coating layer is formed.

7. The display-reproducing apparatus according to claim 3, wherein the display board has a light diffusing layer.

8. The display-reproducing apparatus according to claim 3, wherein the surface of the display board to be written by the writing means is formed of fluorocarbon resin.

9. The display-reproducing apparatus according to claim 2, wherein a reflection plate is placed at the opposite side of the surface to be written by the writing means.

10. The display-reproducing apparatus according to claim 9, wherein the reflection plate is inclined by 45 degrees with respect to the surface of the display board.

11. The display-reproducing apparatus according to claim 1, wherein the reading means scans the surface of the display board on which the information is to be written by the writing means and the project image is given from the same side as the surface to be written.

12. The display-reproducing apparatus according to claim 1, wherein the reading means is a sensor at each side of the surfaces of the display board.

13. The display-reproducing apparatus according to claim 1, wherein the reading means scans the surface opposite the surface on which the information is to be written by the writing means, and the projected image is given from the side of the surface to be written.

14. The display-reproducing apparatus according to claim 3, the display board is formed of a transparent or a semi-transparent plate body and an opaque plate body which is placed by the opposite side of the surface to be written by the writing means, and the reading means is moved between the both plate bodies to read the information on the transparent or semi-transparent plate body.

15. The display-reproducing apparatus according to claim 13, wherein the display board has a layer which allows a part of incident light to pass through and causes irregular reflection to the other part of the light.

16. The display-reproducing apparatus according to claim 15, wherein the display board has a light diffusing layer.

17. The display-reproducing apparatus according to claim 15, wherein the surface of the display board to be written by the writing means is formed of fluorocarbon resin.

* * * * *